United States Patent [19]
Phillips

[11] Patent Number: 5,332,448
[45] Date of Patent: Jul. 26, 1994

[54] APPARATUS FOR CLEANING AIR FILTERS

[76] Inventor: Larry H. Phillips, Box 142 Weyburn,, Saskatchewan, Canada, S4H 2J9

[21] Appl. No.: 91,274

[22] Filed: Jul. 15, 1993

[51] Int. Cl.⁵ ............................................. B08B 9/093
[52] U.S. Cl. ................................. 134/22.18; 15/304; 55/302; 55/429; 95/279; 134/104.3
[58] Field of Search ..................... 15/304; 55/302, 282, 55/429; 95/278-280; 134/22.18, 59, 104.2, 104.3; 210/410, 411

[56] References Cited

U.S. PATENT DOCUMENTS

| | | | |
|---|---|---|---|
| 3,958,296 | 5/1976 | Fell | 15/304 |
| 3,998,656 | 12/1976 | Motto | 15/304 X |
| 4,581,050 | 4/1986 | Krantz | 55/429 X |
| 4,808,234 | 2/1989 | McKay et al. | 15/304 X |

*Primary Examiner*—Charles Hart
*Attorney, Agent, or Firm*—Adrian D. Battison; Stanley G. Ade; Murray E. Thrift

[57] ABSTRACT

An air filter cleaning system comprises a support plate mounted on a frame with a clamping system for clamping an end face of the filter against the underside of the support plate. A supply tank can be filled with air up to a predetermined pressure. A duct communicates from the supply tank to an opening in the support plate. The valve can be opened to substantially instantaneously release the air into the interior of the filter to explode through the filter wall. A collection bag is engaged around the lip on the underside of the support plate to collect the material exploded from the filter wall.

11 Claims, 2 Drawing Sheets

APPARATUS FOR CLEANING AIR FILTERS

BACKGROUND OF THE INVENTION

This invention relates to an apparatus for cleaning air filters.

Air filters are widely used on many motor vehicles and engines to extract dust and other materials from intake air into the engine to prevent the materials from damaging the moving parts of the engine. Many air filters are intended simply to be replaced after a period of use. Other air filters are intended to be washed or otherwise cleaned and replaced. Agricultural vehicles often operate in very dusty conditions and accordingly the air filter must be regularly cleaned to prevent throttling the air supply.

Compressed air lines have been proposed for cleaning such air filters by directing a blast of compressed air onto the inside surface of the filter to cause the collected material on the outside surface to be pushed away from the filter wall. This technique does however have the serious disadvantage that it is possible to damage the filter wall leaving an opening through which unfiltered air may enter. Such wall damage is sometimes not readily visible and hence the engine may be operated with a defective filter for a significant period of time often causing serious engine damage.

Washing of filters is of course often used but this has a significant disadvantage that it is necessary to wait while the filter dries before it can be replaced.

SUMMARY OF THE INVENTION

It is one object of the present invention, therefore, to provide an improved air filter cleaning apparatus and method which allow rapid cleaning of the filter with little or no possibility of damage to the filter wall.

According to a first aspect of the invention there is provided an apparatus for cleaning an air filter including an end face having an air passage therein, a filter wall and a hollow interior between the end face and the filter wall, the apparatus comprising a support plate, clamp means for butting the end face of the air filter against the support plate, engaging means for engaging a collection bag around the air filter, an air supply tank, means for charging the air supply tank with compressed air to provide a charge of compressed air, an opening in the support plate for communicating through the air passage in the end face of the filter into the hollow interior of the filter, a duct extending from the air supply tank to the opening, valve means in the duct for substantially instantaneously releasing the charge of air from the tank to pass into the hollow interior of the filter and through the filter wall, and means for venting air from inside the collection bag and outside the filter.

According to a second aspect of the invention there is provided a method for cleaning an air filter including an end face having an air passage therein, a filter wall and a hollow interior between the end face and the filter wall, the method comprising providing a support plate, butting the end face of the air filter against the support plate, engaging a collection bag around the air filter, charging an air supply tank with compressed air to provide a charge of compressed air, providing an opening in the support plate for communicating through the air passage in the end face of the filter into the hollow interior of the filter, substantially instantaneously releasing the charge of air from the tank to pass into the hollow interior of the filter and through the filter wall, and venting air from inside the collection bag and outside the filter.

One embodiment of the invention will now be described in conjunction with the accompanying drawings in which:

DESCRIPTION OF THE DRAWINGS

In the drawings like characters of reference indicate corresponding parts in the different figures.

DETAILED DESCRIPTION

Figure 1:
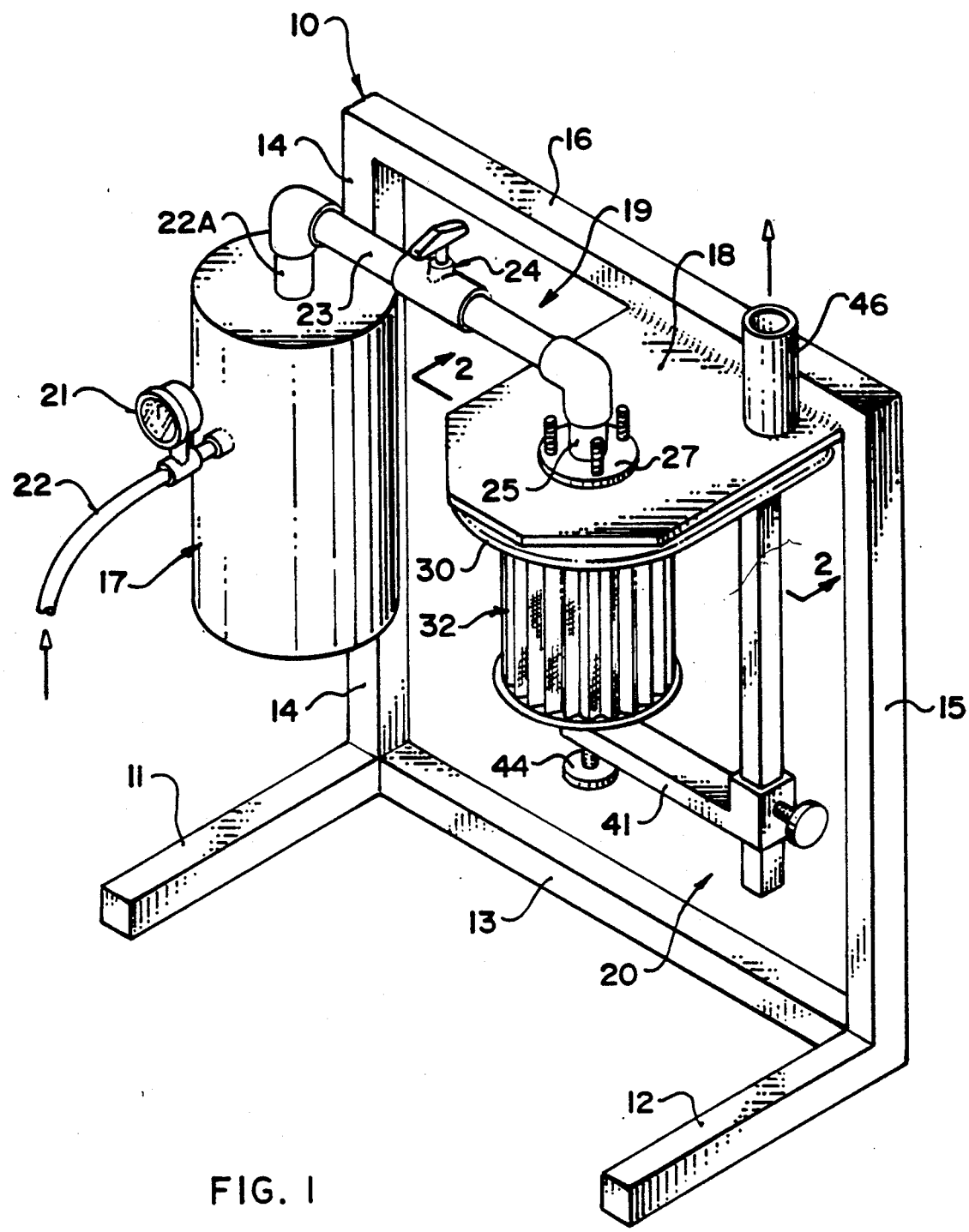
FIG. 1 is an isometric view of the apparatus according to the present invention.

The apparatus comprises a frame 10 including two horizontal base legs 11 and 12 for resting upon a ground surface or other support surface. A cross rail 13 interconnects adjacent ends of the legs. The frame further includes a pair of vertical posts 14 and 15 each of which extends vertically upwardly from outer ends of the horizontal rail 13. A cross rail 16 interconnects the upper ends of the posts 14 and 15.

The apparatus further includes an air supply tank 17 attached to the post 14, a support plate 18 attached to the cross rail 16 and extending outwardly therefrom, a duct 19 and a clamping assembly 20. The tank 17 comprises a simple cylindrical tank of a volume slightly greater than the volume of the largest filter expected to be used with the device. The tank 17 includes a pressure gauge 21 and an inlet connection 22 for receiving compressed air from the conventional compressed air supply available to persons working regularly with vehicles. The supply tank can therefore be charged up to a predetermined or selected pressure and the supply duct 22 closed to hold the charge of air within the tank.

The duct 19 includes a vertical duct portion 22A extending from the top of the tank 17. The vertical portion 22A is connected to a horizontal portion 23 within which is mounted a valve 24 operable manually to move from a fully closed position closing the duct 19 to a fully open position which releases air to flow along the duct across the full area of the duct for rapid transmission of the air from the tank. The duct further includes a second vertical portion 25 parallel to the vertical portion 22A and extending through the support plate 18.

Figure 2:
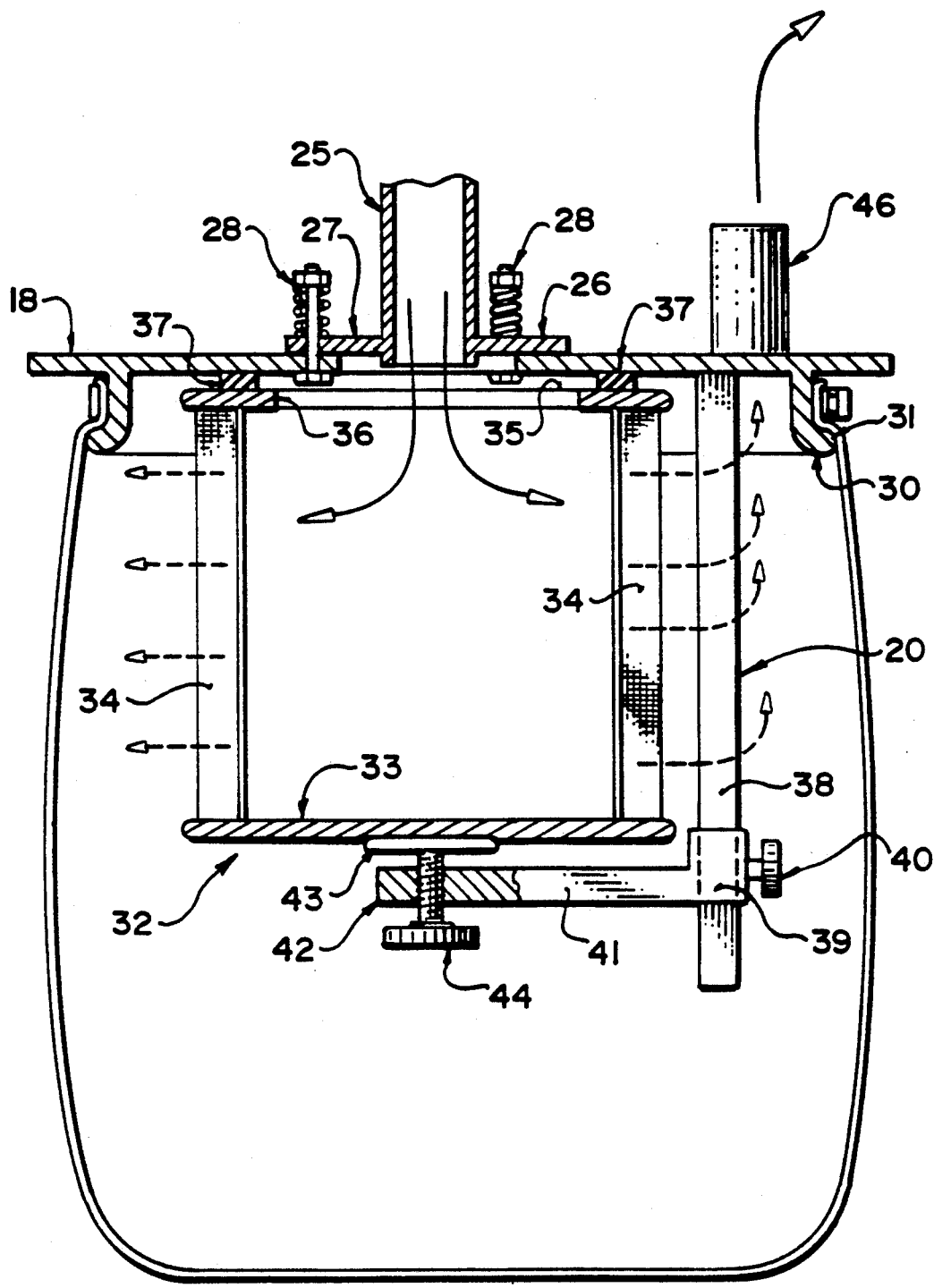
FIG. 2 is a cross sectional view along the lines 2—2 of FIG. 1.

The support plate 18 is welded to a front face of the cross rail 16 so as to extend outwardly therefrom above the base of the frame. The support plate 18 simply comprises a flat plate of sufficient thickness to be self supporting from the rail 16. The flat plate 18 has a central opening 26 through which the duct 25 extends as shown best in FIG. 2. Around the duct 25 is provided an annular plate 27 which acts to close the annular space between the duct 25 and the opening 26. The plate 27 is biased into a closed position against the upper surface of the plate 18 by a plurality of spring retaining pins 28. Thus each pin is mounted on the plate 18 and extends through a hole in the plate 27 to an upper head so the spring is positioned between the head and the upper surface of the plate 27 to bias the plate 27 downwardly onto the plate 18. However on the presence of excess pressure under the support plate, the pressure release plate 27 can lift or pop up to release air from the opening 26 and to relieve the excess pressure.

On the underside of the plate 18 is provided a lip 30 in the form of a generally annular ring lying in a horizontal plane with a lower edge 31 of the ring spaced downwardly from the underside of the support plate. This ring or lip thus provides an engaging means for receiving an upper edge of a conventional garbage bag wrapped around the lip. Garbage bags of the type having a top tie at an integral part of the bag are preferred since this tie can simply be wrapped around the lip and pulled tight to hold the bag in place suspended downwardly from the lip.

A conventional air filter is indicated at 32 and includes a base wall 33, a filter wall 34, an end face 35 having an air passage 36 and a sealing gasket 37. The air filter as shown is only one example and air filters can of course vary in dimensions from filters having very long axial length and very small diameter to filters which have a very short axial length in comparison with the diameter. In any event all of the filters intended to be used with the device as shown have an end face with a circular gasket surrounding the air passage in the end face so that the end face can be clamped up against the underside of the support plate. The clamping of the air filter is effected by the clamping device indicated at 20. This includes a vertical rod 38 which is attached to the underside of the support plate and extends downwardly therefrom at right angles thereto. The rod 38 is positioned on the support plate so that it lies along side the filter at a position spaced from the filter wall. On the rod is mounted a slidable sleeve 39 which can move upwardly and downwardly along the rod to a position set by a clamping screw 40. The sleeve carries a clamp arm 41 which projects outwardly therefrom at right angles to the rod 38 to an outer end 42 positioned underneath the end wall 33 of the filter. A clamping plate 43 is arranged to engage the outside surface of the end wall 33 of the filter and this can be moved vertically by a screw 44. Course adjustment of the clamping assembly can thus be effected by moving the slide 39 vertically along the rod. Fine adjustment of the pressure of the gasket against the support plate can be adjusted by the screw 44.

A vent duct 46 extends through the support plate at a position inside the lip 30 and outside the filter so as to communicate with the interior of the bag at a position outside the filter. The vent 46 can be ducted to a position outside of a building or work area to remove any airborne dust from the filter.

In operation, the filter to be cleaned is mounted on the clamping assembly and brought into position against the underside of the support plate. The valve 24 is moved to the closed position. The tank 17 is charged with a charge of compressed air up to the required air pressure. The collection bag is wrapped around the lip 30 so as to surround the air filter to be cleaned. The valve 24 is opened so as to substantially instantaneously release the air from the supply tank to flow into the interior of the filter. The air is thus caused to effectively explode through the filter wall causing the collective material on the filter wall to be blasted away from the filter wall to fall into the collection bag. This air then releases the exploded material to fall into the bag with the air escaping through the duct 46. The material can thus be collected in the bag, the bag removed and the filter removed from the system for immediate replacement onto the engine to be filtered.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. Apparatus for cleaning an air filter including an end face having an air passage therein, a filter wall and a hollow interior between the end face and the filter wall, the apparatus comprising a support plate, clamp means for butting the end face of the air filter against the support plate, engaging means for engaging a collection bag around the air filter, an air supply tank, means for charging the air supply tank with compressed air to provide a charge of compressed air, an opening in the support plate for communicating through the air passage in the end face of the filter into the hollow interior of the filter, a duct extending from the air supply tank to the opening, valve means in the duct for substantially instantaneously releasing the charge of air from the tank to pass into the hollow interior of the filter and through the filter wall, and means for venting air from inside the collection bag and outside the filter.

2. The apparatus according to claim 1 including pressure release means between the tank and the hollow interior of the filter to prevent excess pressure in the hollow interior of the filter from damaging the filter wall.

3. The apparatus according to claim 2 wherein the pressure release means comprises a pressure release plate mounted on the support plate and movable relative thereto against spring bias.

4. The apparatus according to claim 3 wherein the pressure release plate is annular and surrounds the duct.

5. The apparatus according to claim 1 wherein the engaging means comprises a lip around the support plate onto which an edge of the bag can be engaged.

6. The apparatus according to claim 5 wherein the lip is arranged substantially around a peripheral edge of the support plate.

7. The apparatus according to claim 1 wherein the clamp means comprises a rod arranged substantially at right angles to the support plate, a slide member movable along the rod, a clamp arm extending from the slide member substantially at right angles to the rod and a clamp screw arranged at an outer end of the clamp arm.

8. The apparatus according to claim 1 wherein the vent means is arranged in the support plate at a position thereon outside the end face of the filter.

9. The apparatus according to claim 1 including a frame for supporting the tank and support plate as an integral unit.

10. A method for cleaning an air filter including an end face having an air passage therein, a filter wall and a hollow interior between the end face and the filter wall, the method comprising providing a support plate, butting the end face of the air filter against the support plate, engaging a collection bag around the air filter, charging an air supply tank with compressed air to provide a charge of compressed air, providing an opening in the support plate for communicating through the air passage in the end face of the filter into the hollow interior of the filter, substantially instantaneously releasing the charge of air from the tank to pass into the hollow interior of the filter and through the filter wall, and venting air from inside the collection bag and outside the filter.

11. The method according to claim 10 including providing pressure release means between the tank and the hollow interior of the filter to prevent excess pressure in the hollow interior of the filter from damaging the filter wall.

* * * * *